US012733598B2

(12) United States Patent
Stetson

(10) Patent No.: US 12,733,598 B2
(45) Date of Patent: Sep. 15, 2026

(54) AGRICULTURAL CONTAINER AND METHOD OF USE THEREOF

(71) Applicant: Ergonomic Gardens, LLC, Yarmouth, ME (US)

(72) Inventor: Chris Stetson, Yarmouth, ME (US)

(73) Assignee: Ergonomic Gardens, LLC, Yarmouth, ME (US)

( * ) Notice: Subject to any disclaimer, the term of this patent is extended or adjusted under 35 U.S.C. 154(b) by 0 days.

(21) Appl. No.: 19/361,067

(22) Filed: Oct. 17, 2025

(65) Prior Publication Data

US 2026/0041045 A1 Feb. 12, 2026

Related U.S. Application Data

(63) Continuation of application No. 18/381,721, filed on Oct. 19, 2023, now abandoned.

(60) Provisional application No. 63/418,226, filed on Oct. 21, 2022.

(51) Int. Cl.
*A01G 9/28* (2018.01)
*F16B 5/02* (2006.01)

(52) U.S. Cl.
CPC . *A01G 9/28* (2018.02); *F16B 5/02* (2013.01)

(58) Field of Classification Search
CPC . A01G 9/28; A01G 9/02; A01G 9/026; A01G 9/0302; F16B 5/02; F16B 5/0004; B65D 7/24; B65D 7/30
See application file for complete search history.

(56) References Cited

U.S. PATENT DOCUMENTS

| | | | | |
|---|---|---|---|---|
| 3,951,294 | A | 4/1976 | Wilson | |
| 12,532,818 | B1 * | 1/2026 | Xiong | A01G 9/28 |
| 2010/0242357 | A1 * | 9/2010 | Vogler | A01G 9/28 47/33 |
| 2015/0208593 | A1 * | 7/2015 | Aronow | A01G 9/28 47/65.5 |
| 2017/0086386 | A1 | 3/2017 | Cudmore | |
| 2017/0258015 | A1 | 9/2017 | Cudmore | |
| 2022/0117170 | A1 * | 4/2022 | Barcik | A01G 9/28 |
| 2023/0111009 | A1 * | 4/2023 | Xiong | A01G 9/249 47/21.1 |
| 2025/0146268 | A1 * | 5/2025 | Buckle | A01G 9/28 |
| 2025/0241250 | A1 * | 7/2025 | Griffin | A01G 9/28 |

* cited by examiner

*Primary Examiner* — Trinh T Nguyen

(57) ABSTRACT

An agricultural container and method of use for generating and accessing composted materials that is easily assembled and disassembled through the use of comparatively few panels and a locking system that enables the fasteners to be removed or released from the outside of a container that is filled with agricultural materials.

11 Claims, 11 Drawing Sheets

AGRICULTURAL CONTAINER AND METHOD OF USE THEREOF

BACKGROUND INFORMATION

Field of the Invention

The invention relates to agricultural containers that are filled with soil and methods of use thereof, and more particularly methods of constructing and using raised beds in a hügelkultur process.

Discussion of Prior Art

Agricultural containers, also referred to as garden beds or raised garden beds, are containers that are used in a form of gardening whereby the soil is raised above ground level and enclosed in some manner. This type of gardening has a number of advantages, including: raising the working surface to an ergonomic height; ease of soil management and soil improvement; controlling and affecting a healthier soil biome; weed control; and, resource conservation in terms of space, soil, water, fertilizer, and energy consumption.

However, filling these agricultural containers with quality soil is a logistical and economic challenge for the user due to the considerable volume of the container. For example, most containers measure between 3 and 4 feet in width, 6 and 8 feet in length, and many have a height of 2.5 to 3 feet, and depending on those dimensions many of these containers hold anywhere from 40 to 100 cubic feet of material.

An effective, economical practice is the application of hügelkultur. In hügelkultur, the user fills the beds with inexpensive, raw organic materials often generated on site as part of normal activities such as wood, wood chips, brush, leaves, grass clippings or food scraps that are not optimal for composting and would otherwise need to be disposed. The top layer of the bed is working soil for agriculture, while burying the raw organic material facilitates its decomposition.

The state of the art in raised agricultural containers strives to create inexpensive, shippable, and permanent beds that are assembled at the point of use. To balance these competing goals, most raised bed containers come in a disassembled package with many different sections in order to facilitate shipping. Typically, the separate sections are flat or have a minimal curvature, again to facilitate ease of the shipping process. The sections are also frequently made of lightweight materials, which do not tend to have a great deal of strength.

To assemble such a container in a manner that lasts over time, the user/assembler must use dozens and sometimes hundreds of fasteners, generally screws, bolts, nuts, and/or washers, to combine the different sections. In some instances, they also require additional support bars within the container to prevent the sides from collapsing over time. Thus, the assembly process typically takes hours and involves hundreds of components.

The amount of time required for the hügelkultur process is in the order of many years, after which agriculturally valuable soil has been created. However, accessing all of this soil is not easy in most containers, and in particular towards the bottom of the containers.

Conventional containers are also not easily disassembled after years of use as the fasteners are not accessible from the inside surface and are frequently corroded and fused in place. In order to recover the valuable soil created by the hügelkultur process, the user typically has to dig down into the container from the top, which is often a long and painful process.

What is needed, therefore, is a raised agricultural container with a fastening system that allows an operator to conveniently assemble the container and to disassemble the container from the outer surface so as to easily recover the composted soil created from the hügelkultur process.

BRIEF SUMMARY OF THE INVENTION

The invention is an agricultural container and method of use, whereby the container is comprised of a plurality of panels that are fastened together with a lock and key design such that the "key" is held in place by fitting into a "lock" that includes a narrow aperture that is contiguous with a wider aperture. The plurality of panels includes two end panels that are each curved in an approximate U-Shape that either connect to one another when they are the only panels in the plurality of panels, or they connect to side panels that run in parallel when additional panels are provided.

This lock and key design enables a user to quickly assemble the container in a strong and secure manner while enabling the user to disassemble the container after years of use in order to have easy access to the soil and/or relocate the container. The panels are disassembled or decoupled by moving the "key" from the narrow aperture to the wide aperture and then punching it through the walls of the container to release the connection.

Once disassembled, the soil is easily accessed. The container may then be re-assembled, re-filled with hügelkultur base materials and re-topped with soil. By way of example: A user may fill one container with hügelkultur materials and top it with six inches of soil for use. In several years, the bed may be disassembled. A 36" bed provides enough high-quality topsoil to create six new hügelkultur beds at the point of use.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIGS. 1-11 illustrate the agricultural container 100 according to the invention, including two or more panels 10 and a locking system 30. The at least two panels are comprised of a sturdy material and configured in a manner that provides a strong container when assembled with the locking system. The locking system 30 is configured to allow for a convenient assembly process while also enabling a user to disassemble the container 100 after years of use to access and utilize the soil that may be generated through a hügelkultur process.

Figure 11:
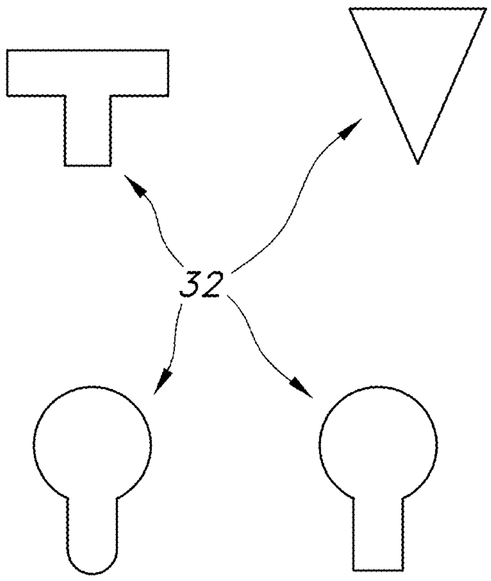
FIG. 11 illustrates different designs for the keyhole.

The locking system 30 includes a plurality of fastening points or openings 32 in the panels 10 that have a "keyhole shape", the keyhole shape including a narrow aperture 32A contiguous with a wider aperture 32B. Various keyhole shapes are illustrated in FIG. 11. The locking system also includes a plurality of fasteners 34 that are configured to fit through the openings 32 and secure the two panels 10 together. In most embodiments, the narrow aperture 32A is on the bottom of the keyhole. Once the container is filled with material, those materials settle over time, and this exerts a downward force on the fastener such that it is advantageous to have the narrow aperture 32A beneath the larger aperture 32B, otherwise it is possible that the settling process may push out the fastener.

Figure 7:
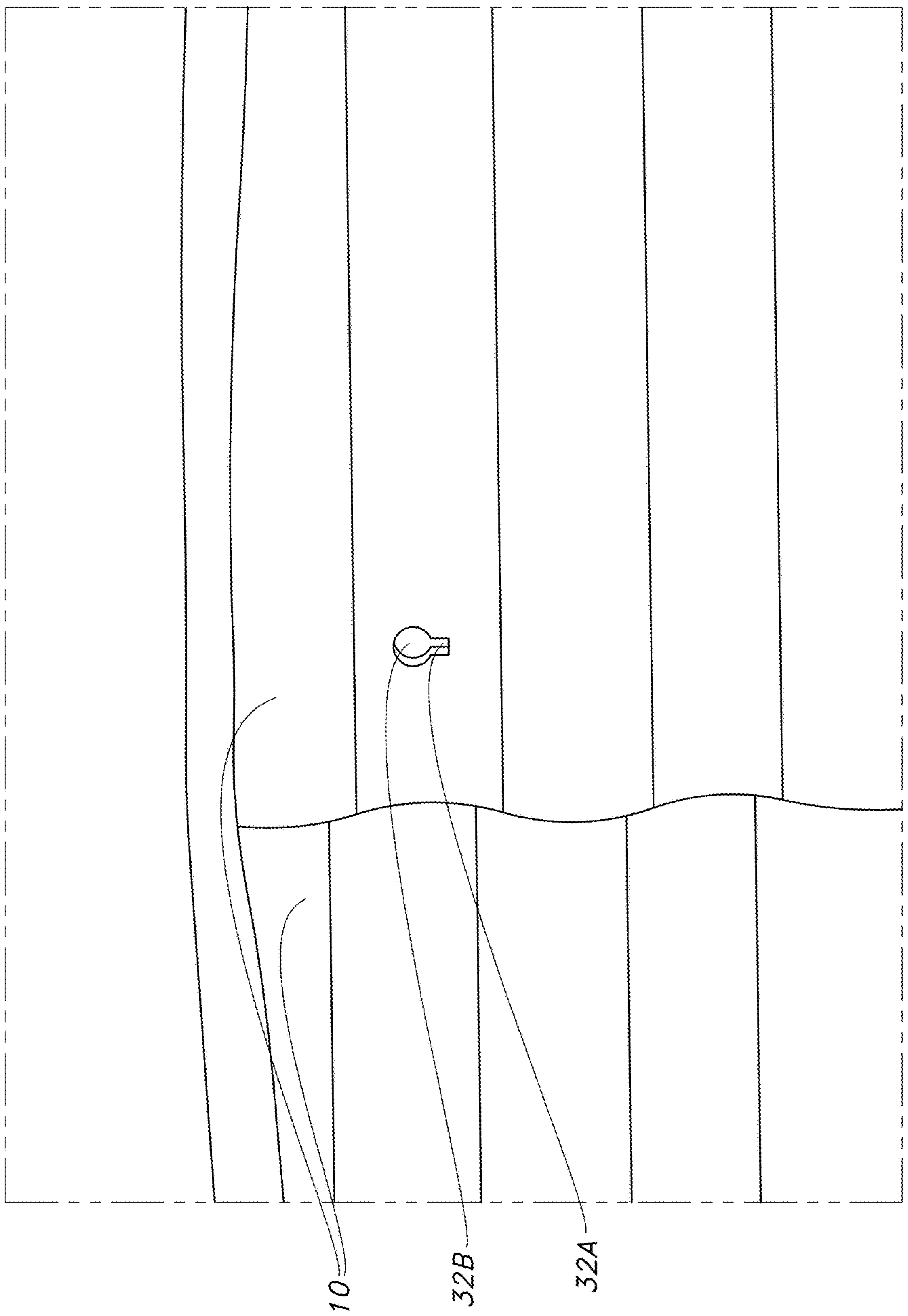
FIG. 7 is a drawing of the keyhole between two panels that are in alignment.
Figure 8:
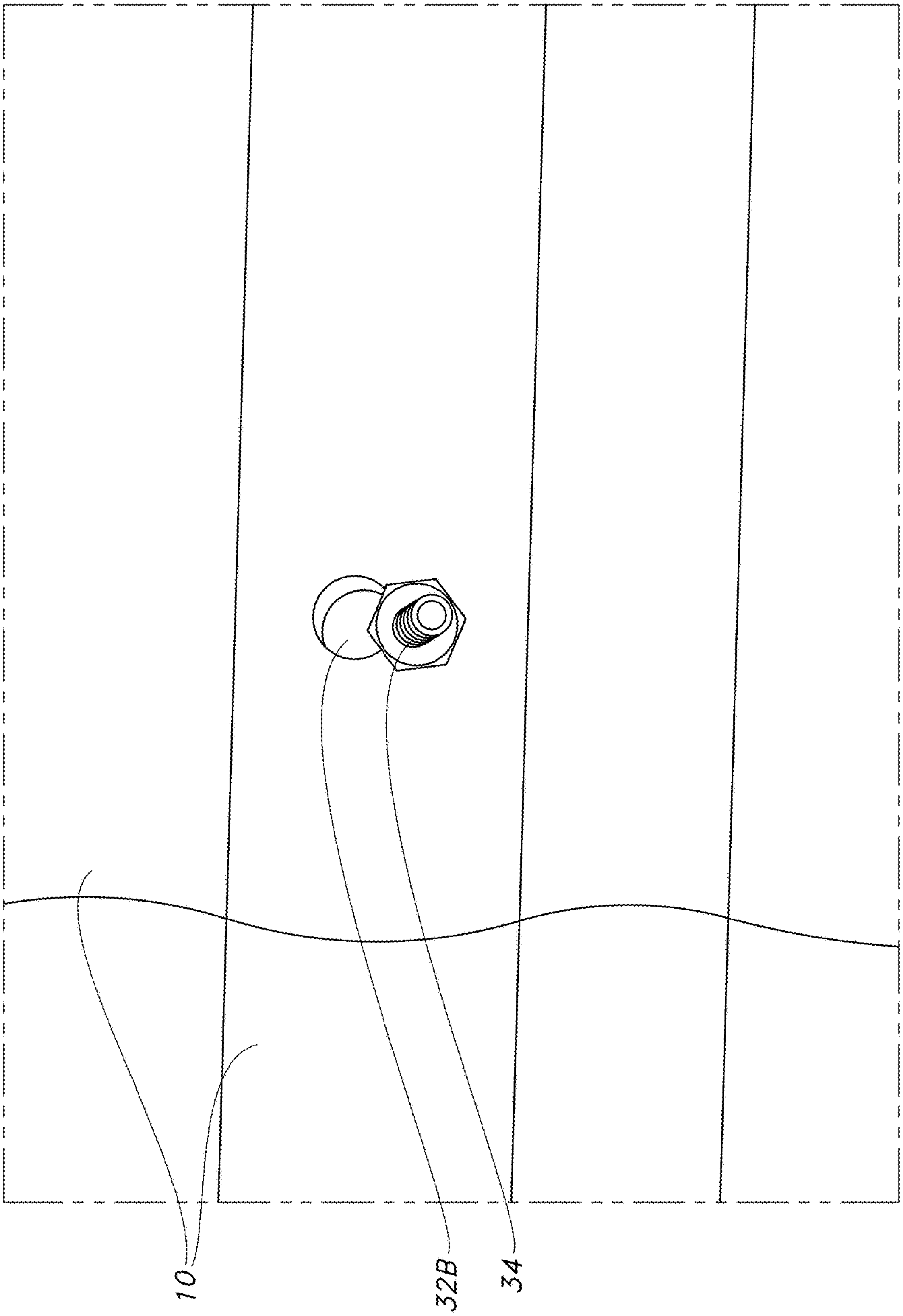
FIG. 8 is a drawing of the locking mechanism from inside the container.
Figure 9:
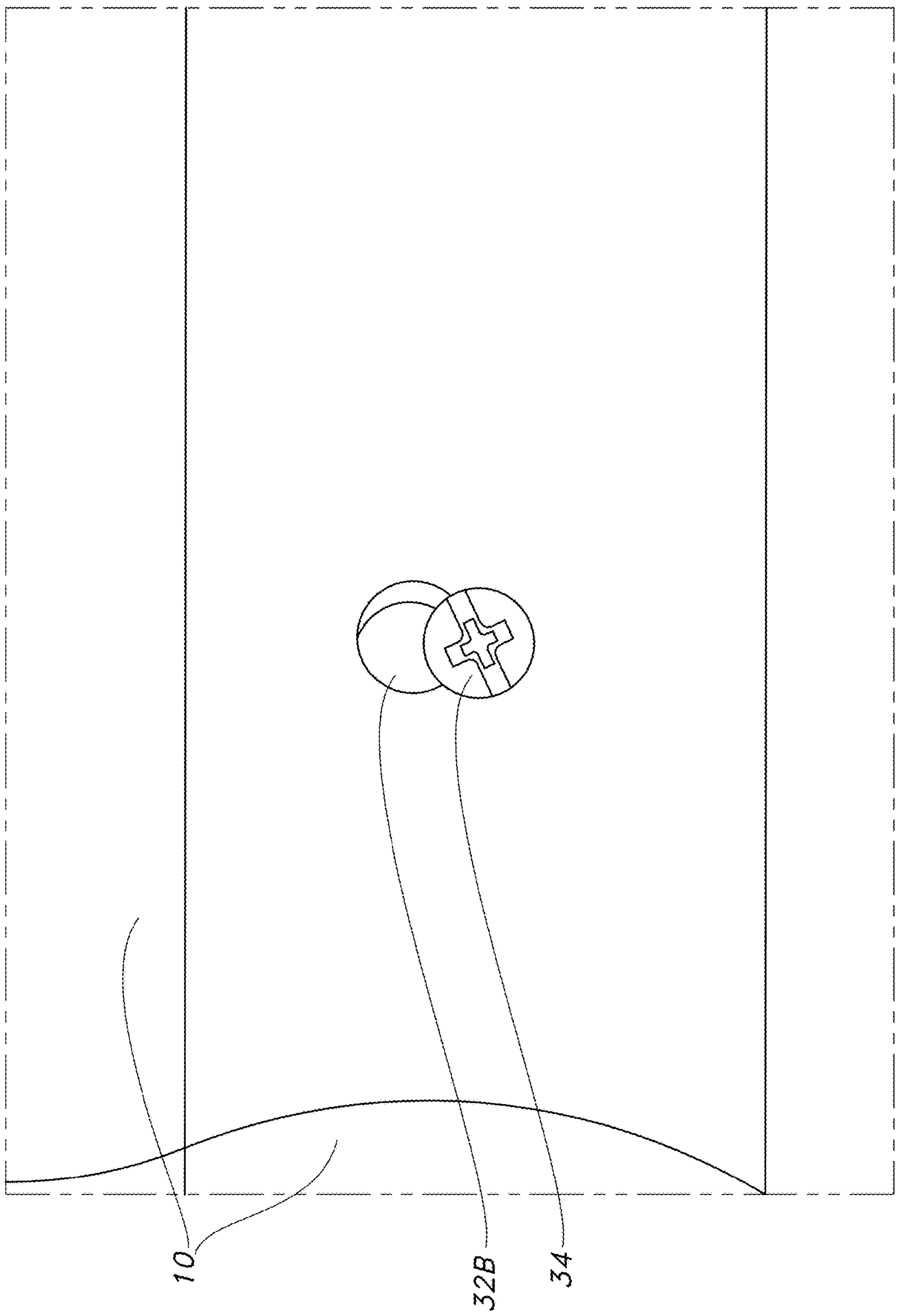
FIG. 9 is a drawing of the locking mechanism from outside the container.
Figure 10:
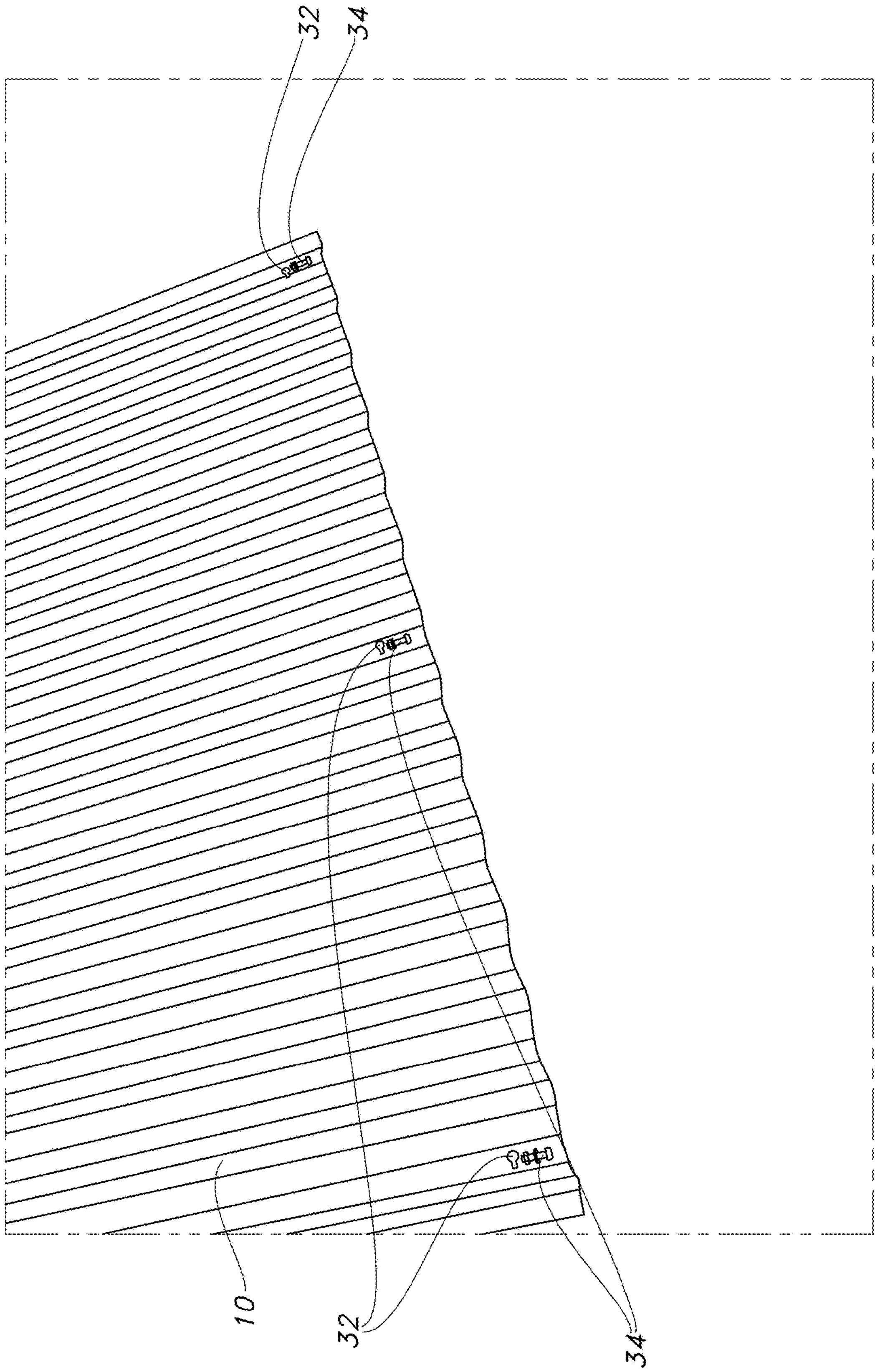
FIG. 10 is a drawing of a container panel lying on the ground with three locking mechanisms.

FIGS. 7-9 illustrate one embodiment of the locking system 30. Specifically, FIG. 7 illustrates the keyhole opening with two panels in alignment to be secured, while FIG. 8 illustrates the fasteners secured on an inside portion of the system, the bolt being secured by a nut and washer, and FIG. 9 illustrates the fastener secured in the narrow aperture with the wider aperture opening above the head of the bolt, the larger aperture slightly larger in size than the end of the fastener.

To assemble the container 100, the panels are arranged so that the ends of two panels overlap and fastening points on separate panels are in alignment. A fastener 34, acting as a locking key, is inserted through the fastening point 32 and secured in the narrow aperture 32A. For example, the fastener may be in the form of a nut and bolt such that the bolt is inserted through the opening, placed in the narrow aperture 32A, and secured with a washer and nut.

To disassemble the container after it has been fully assembled and used for the desired period of time, a user simply slides the fastener into the wide aperture and punches it through the panel walls, which may be done using a variety of conventional tools such as a pin or nail punch.

Figure 1:
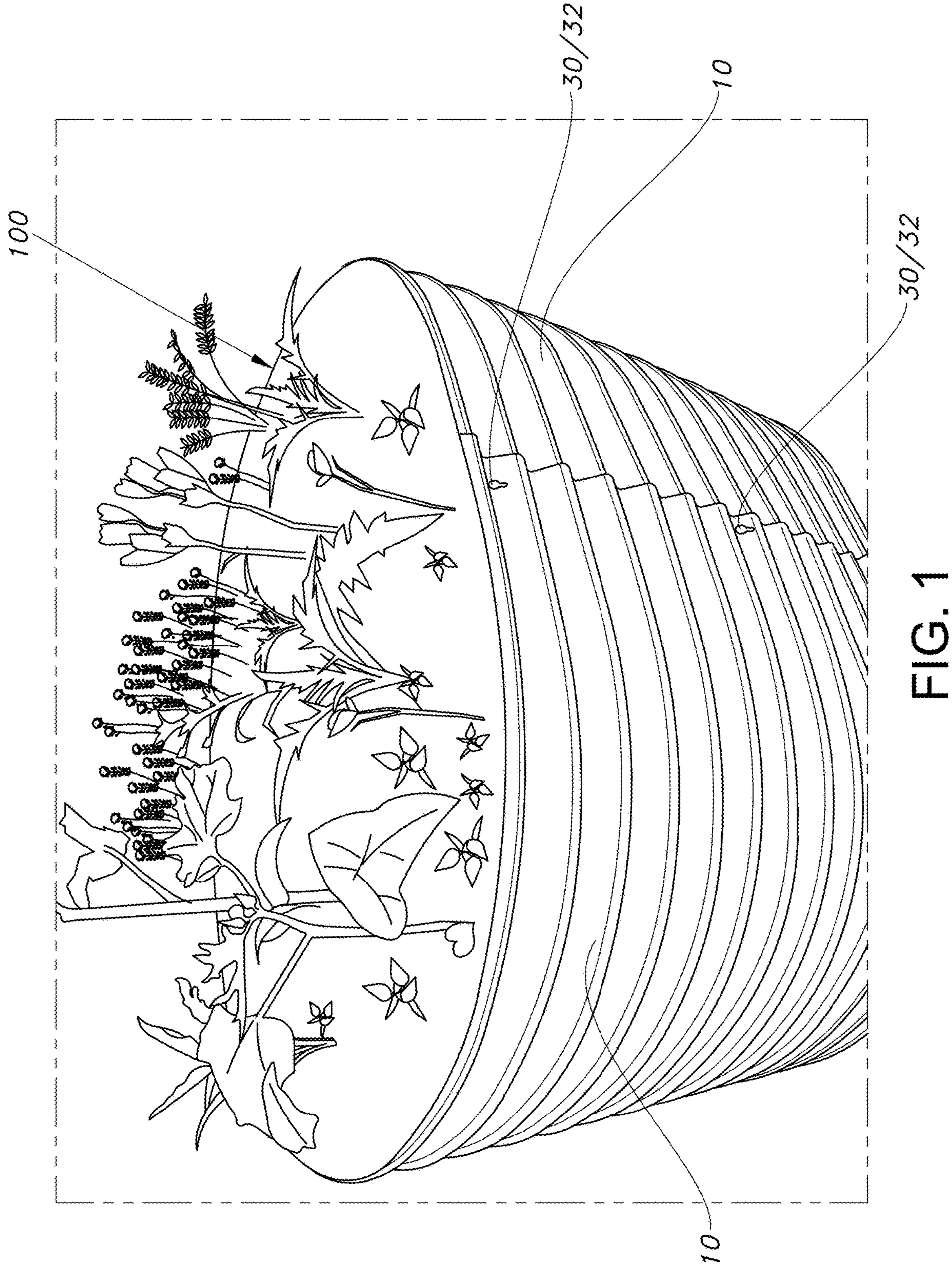
FIG. 1 is a drawing of a fully assembled agriculture container filled with materials and growing vegetables.
Figure 2:
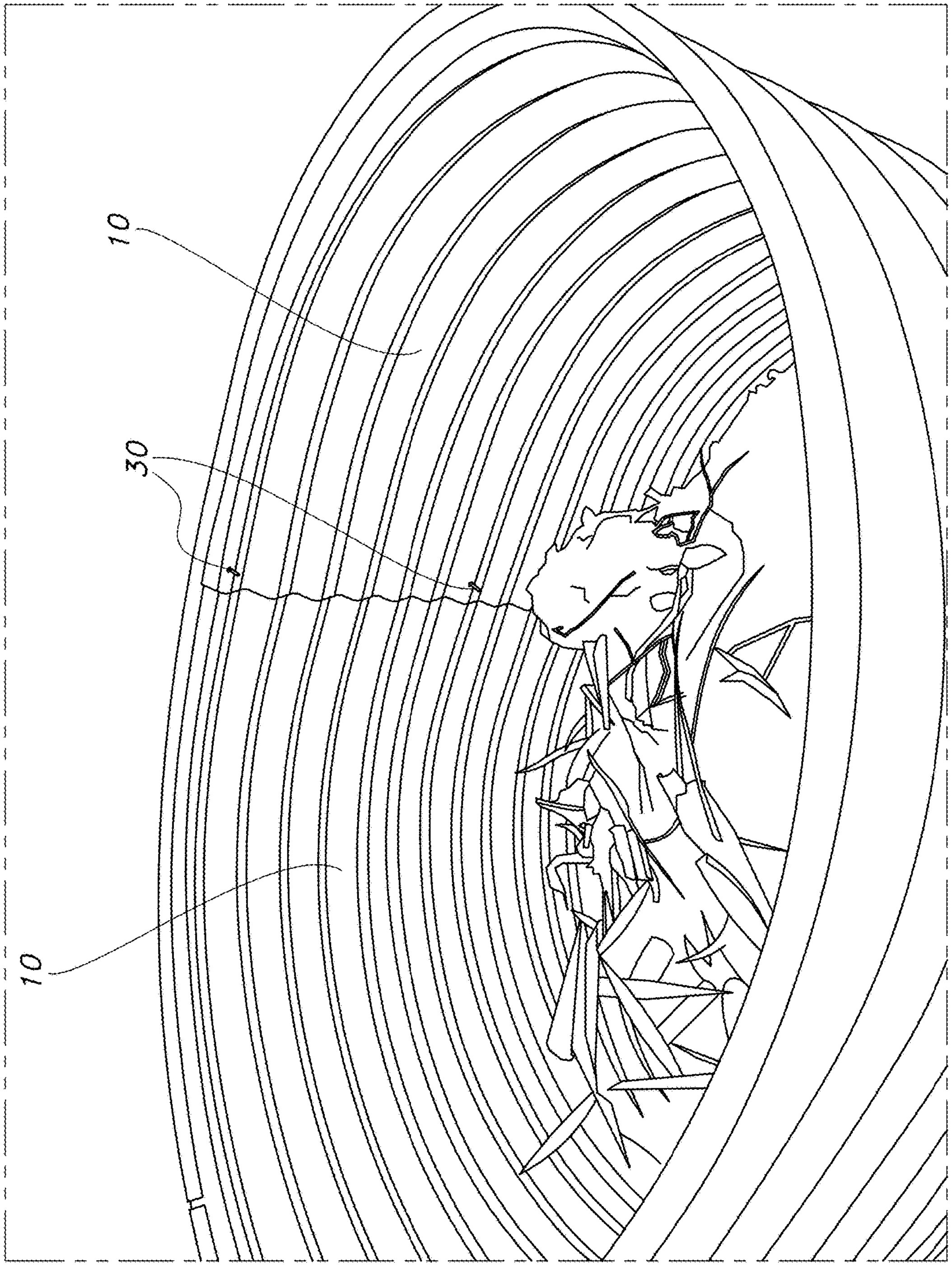
FIG. 2 is a drawing of the fully assembled container with hügelkultur base materials.
Figure 6:
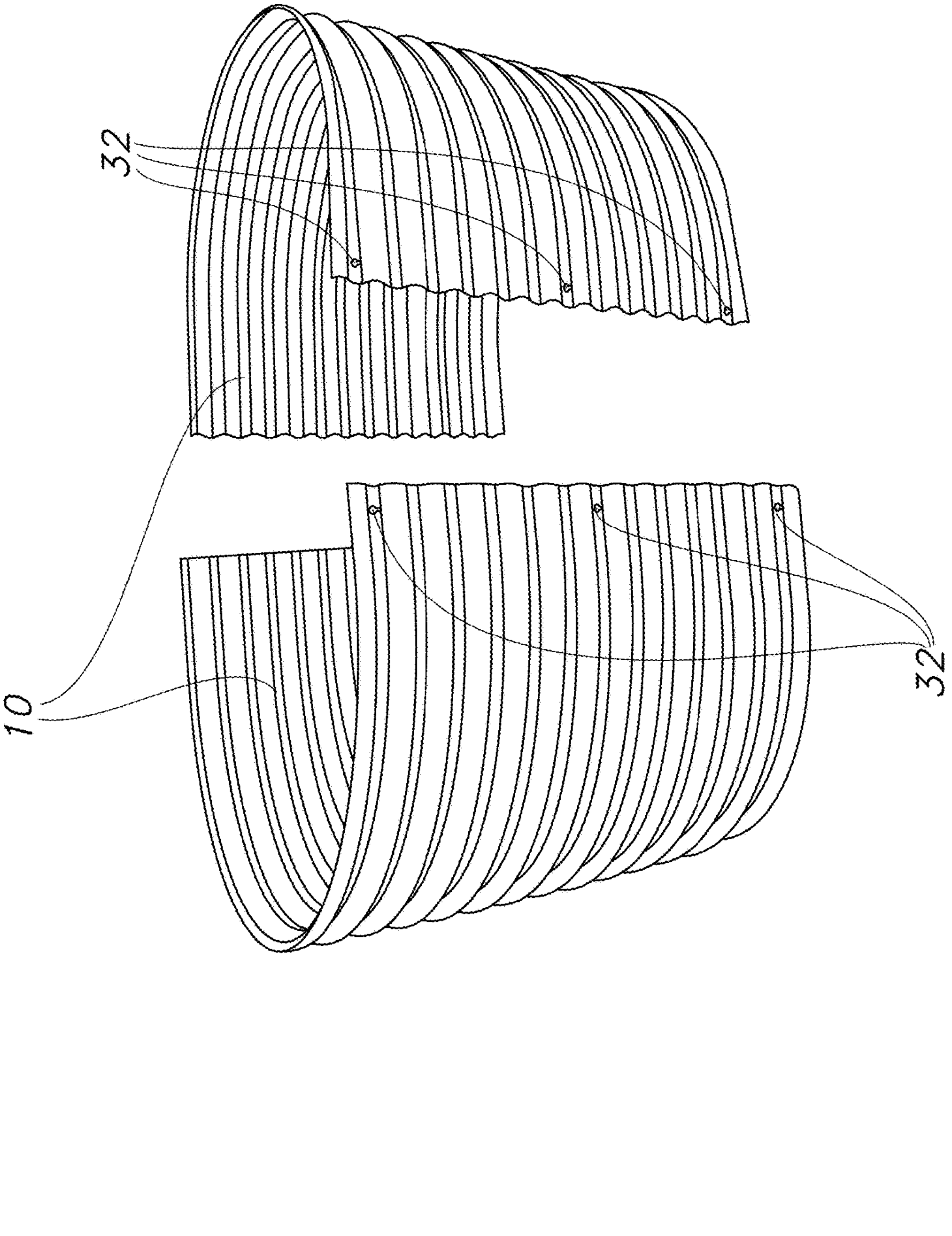
FIG. 6 is a drawing of a two-panel arrangement with the panels slightly separated.

The containers may be constructed in a number of shapes and sizes. In most embodiments, at least two U-Shaped panels are provided, as shown in FIGS. 1, 2, and 6. For example, the embodiment shown in the U-Shaped panels are 36 inches tall, approximately 2 to 2.5 feet long, and approximately 40 inches wide, with a curve radius of 20 inches. The soil placed in containers having such an oval shape causes a force to move from inside the container to move outward towards the panels, and a great deal of that force is directed towards the curved ends. The comparatively large end panels in the disclosed design are adapted to hold up well in spite of the force, and moving the fastening points away from the ends and towards a midpoint helps to create a strong container with fewer fasteners.

Figure 3:
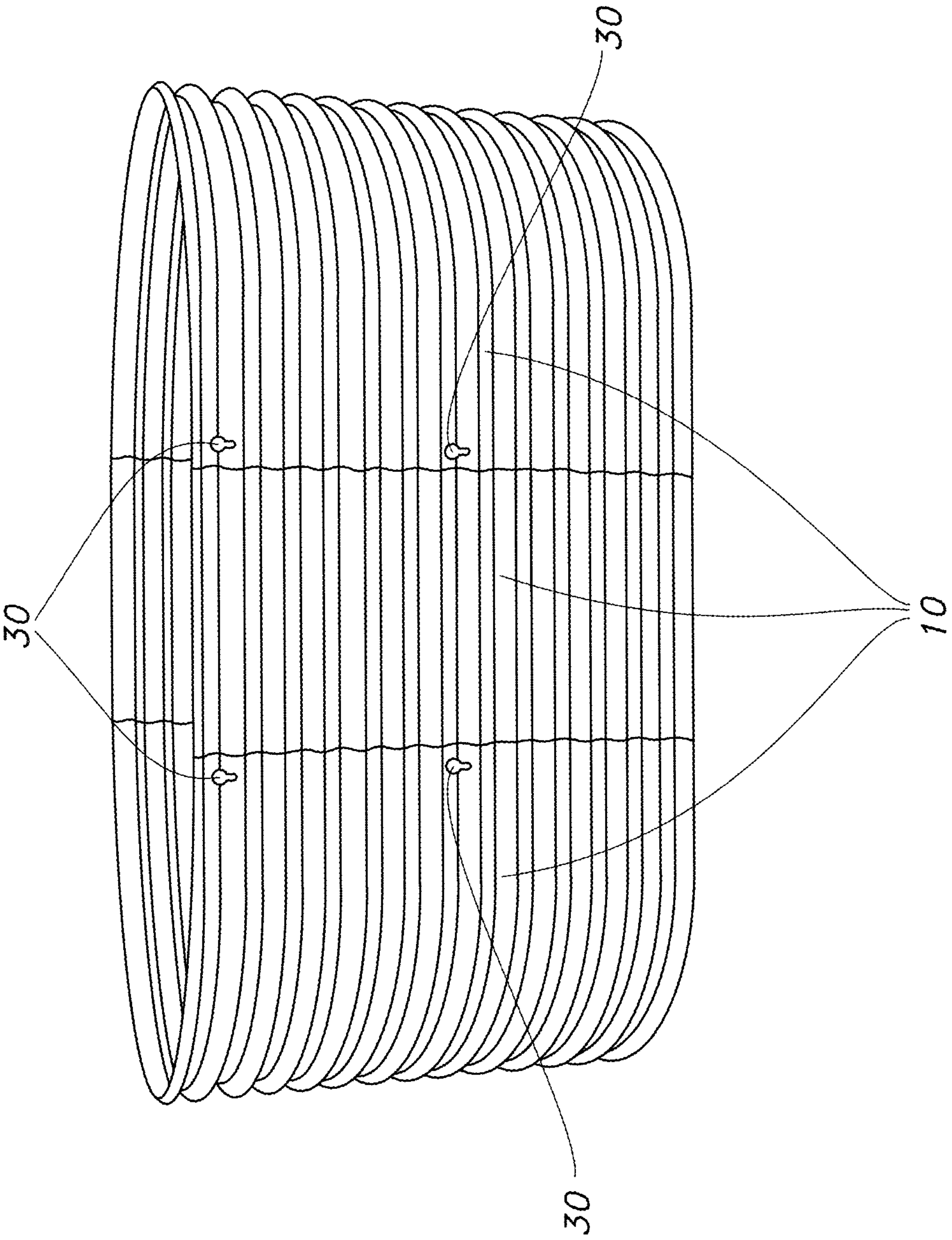
FIG. 3 is a drawing of the fully assembled container from the side, the container comprised of four panel sections.
Figure 4:
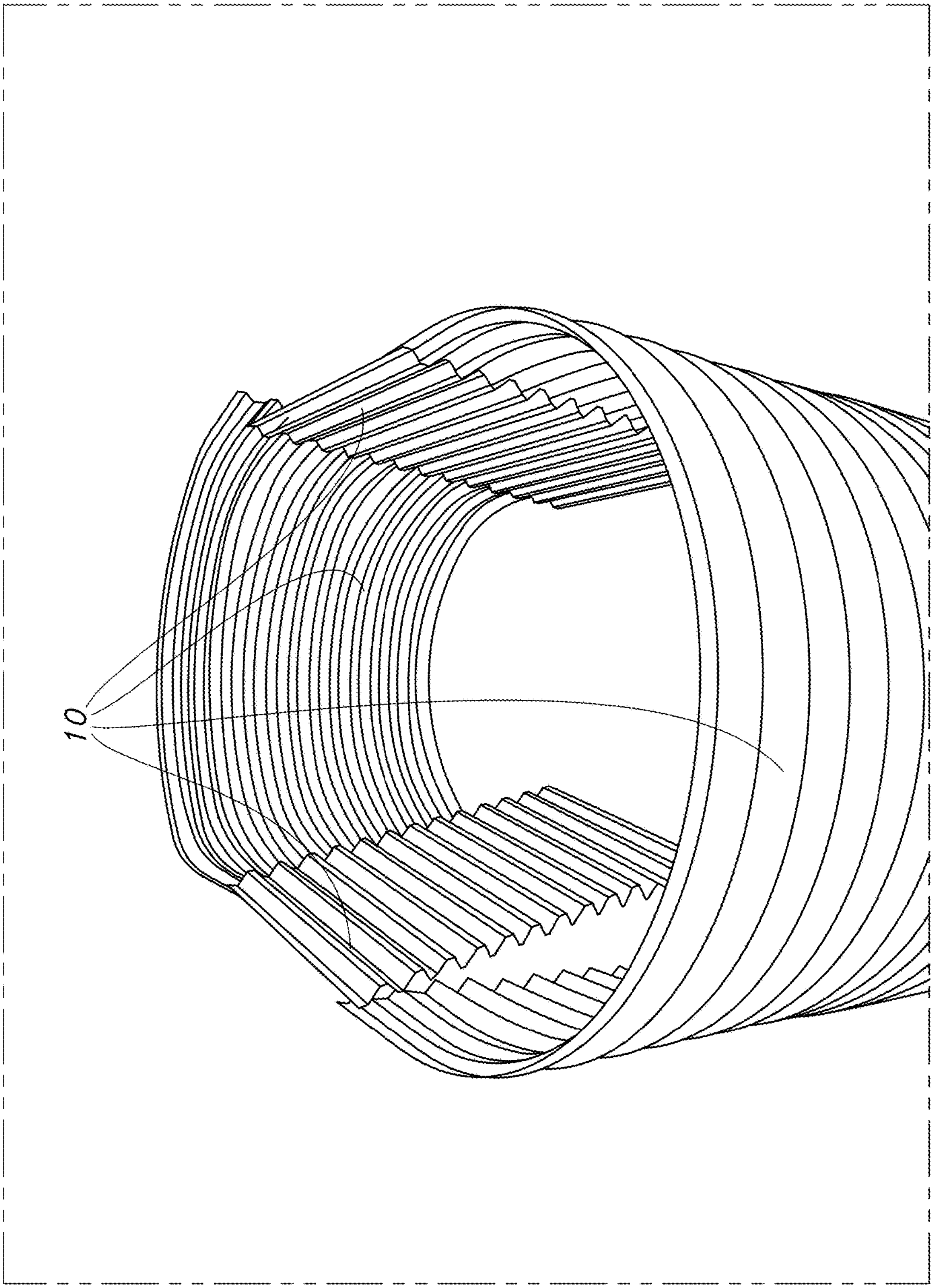
FIG. 4 is a drawing of the container with the four panels in position but not assembled.
Figure 5:
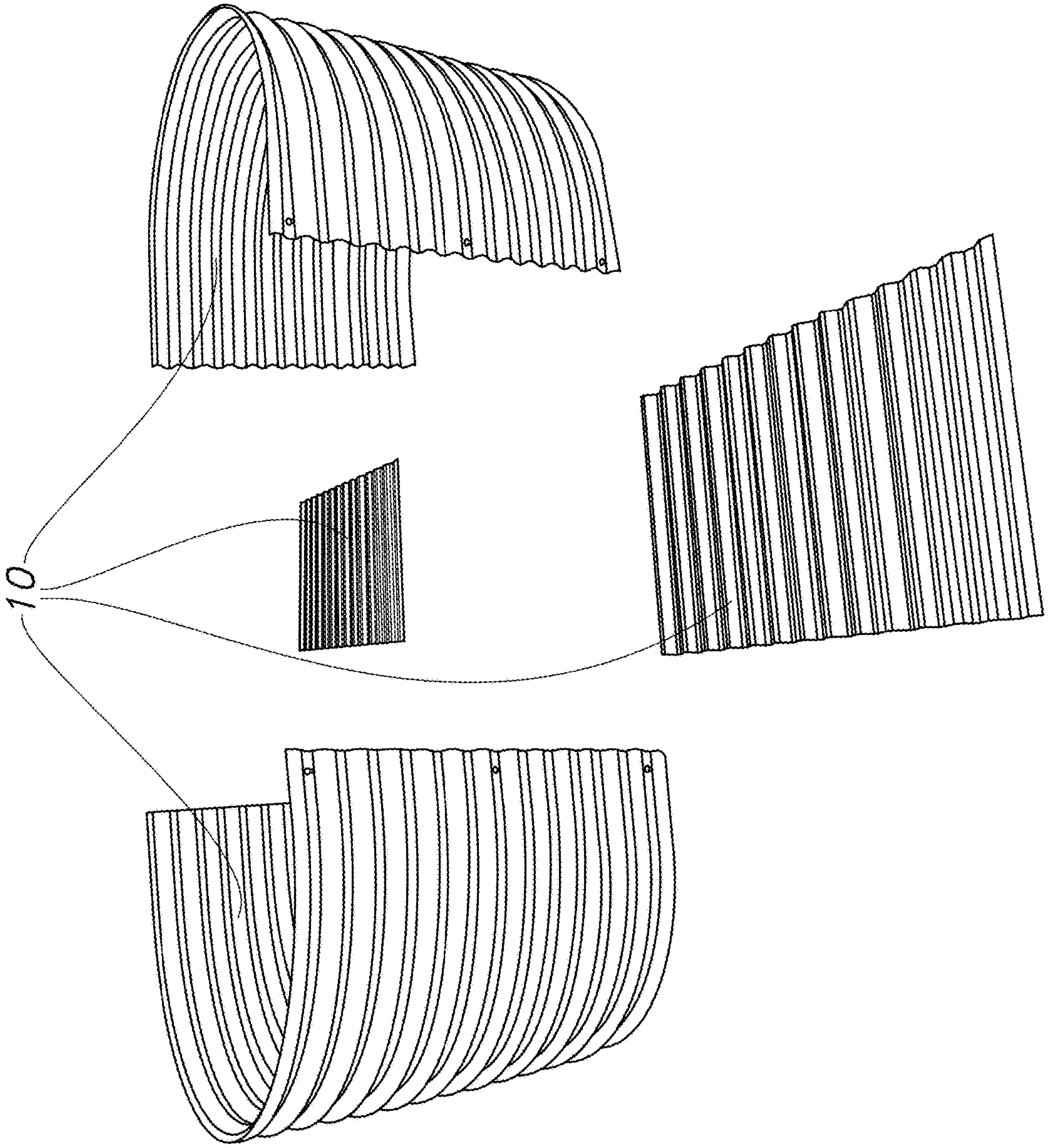
FIG. 5 is a drawing of the four panels in a disassembled state.

In order to increase the size of the container 100 either the two end panels 10 may be increased in size or, as shown in FIGS. 3-5, additional panels 10 that are largely straight in form may be added between the U-shaped sections. In this embodiment the additional panels are 24 inches long by 36 inches tall. The additional panels 10 include the same locking system 30. This particular embodiment may be used, for example, to create a container that is between 6 and 7 feet in length, 3 to 4 feet in width, with a height of approximately 3 feet, using only 12 fasteners.

The embodiment shown in the figures uses groups of three pairs of openings and fasteners, with one pair located near the top of the panel, one located near the middle of the panel, and one located near the bottom. More fasteners may be used. For example, four may prove slightly more advantageous in some designs, however.

Again, the keyhole shaped opening generally enables a user to slide the fastener from the small end of the keyhole to the larger end of the keyhole in order to remove the fastener from the outside of the container with a common tool, for example, with a nail punch. Depending on the location of the opening and the amount of material in the container, the top fastener may be easily accessible and so it may not be necessary to use the punch method and in fact a user may choose to use a larger fastener that is not configured to fit through the opening but that is larger and stronger for a more secure connection. Additionally, the openings on the lower end of the panel are best placed with enough height above the bottom surface to ensure the user is able to punch the fastener upward.

The panels 10 may be comprised of many conventional materials, such as, for example, sheet metal or galvanized steel. In the embodiment shown in the drawings the material is corrugated.

It is understood that the embodiments described herein are merely illustrative of the present invention. Variations in the construction of the Agricultural Container may be contemplated by one skilled in the art without limiting the intended scope of the invention herein disclosed.

What is claimed is:

1. A method of cultivating plants and generating compost in an agricultural container, the method comprising:

- assembling an agricultural container by:
  - arranging a plurality of panels including a first end panel and a second end panel, wherein each of said panels comprises a plurality openings having a narrow aperture contiguous with a wider aperture;
  - aligning the openings of adjacent panels; and
  - securing the panels together using removable fasteners configured to fit through the aligned openings, wherein each fastener is positioned in the narrow aperture of the opening to lock the panels together;
- filling the assembled agricultural container with organic materials for composting, wherein the organic materials comprise:
  - a bottom layer comprising raw organic materials; and
  - a top layer comprising soil;
- planting vegetation in the top layer and maintaining the assembled agricultural container over a decomposition period to cultivate plants while forming a pillar of composted material within the structure; and
- disassembling the panels by removing the fasteners from the exterior surface to separate the panels laterally and expose the pillar of composted material for direct transfer to one or more other planting locations at ground level.

2. The method of claim 1, wherein the bottom layer is comprised of hugelkultur materials and the agricultural container is in the form of a raised garden bed.

3. The method of claim 1, wherein the panels include at least a first U-shaped end panel and a second U-shaped end panel, each comprising a central end section and two integral side extensions that overlap with adjacent panels to provide structural stability during plant cultivation and decomposition.

4. The method of claim 3, further comprising inserting at least one straight intermediate panel between the side extensions of the first and second U-shaped end panels to extend a length of the raised bed structure for increased compost volume.

5. The method of claim 2, wherein the raised bed structure has an interior volume of approximately 56 cubic feet and a height of approximately 36 inches to accommodate layered hugelkultur materials and optimize formation of the pillar of composted materials over a multi-year decomposition period while allowing ergonomic access for planting and maintenance.

6. The method of claim 1, wherein the openings are configured with a keyhole-shape having the narrow aperture positioned below the wider aperture.

7. The method of claim 2, wherein the hugelkultur materials comprise raw organic matter including at least one of wood, wood chips, brush, leaves, grass clippings, or food scraps, positioned at a base to promote efficient decomposition beneath the planted top layer.

8. The method of claim 1, wherein disassembling the agricultural container comprises punching the fasteners through the wider aperture using a conventional tool.

9. The method of claim 1, further comprising relocating the disassembled panels to a new site after compost transfer, reassembling the panels, and repeating the filling, planting, and maintaining steps to enable cyclical plant cultivation and compost generation.

10. The method of claim 1, wherein the period of time sufficient to allow the raw organic materials to decompose is at least one year.

11. The method of claim 1, wherein securing the panels uses fewer than five fasteners per overlapping edge section, facilitating secure assembly for plant support and rapid disassembly for compost access.

* * * * *